Figure 1:
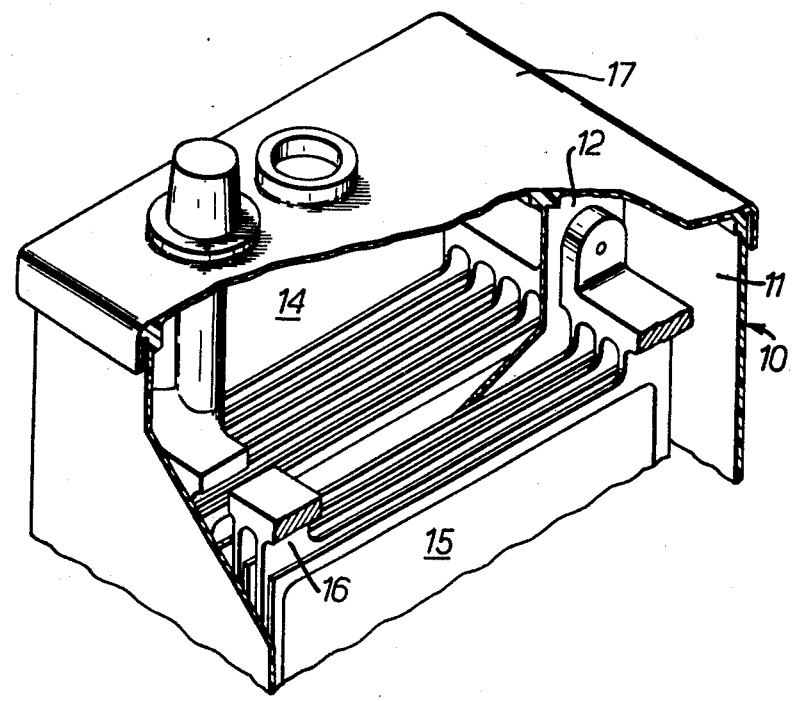

United States Patent [19]
Emerton et al.

[11] 4,144,927
[45] Mar. 20, 1979

[54] CASTING PLATE STRAPS AND/OR INTERCELL CONNECTORS OF ELECTRIC STORAGE BATTERIES

[75] Inventors: Barry G. Emerton, North Rocks; William A. Weir, Fairfield; Thomas F. McLean, Sylvania Heights, all of Australia

[73] Assignee: Chloride Batteries Australia Limited, Padstow, Australia

[21] Appl. No.: 730,250

[22] Filed: Oct. 6, 1976

[30] Foreign Application Priority Data

Oct. 7, 1975 [AU] Australia .............................. 3472/75

[51] Int. Cl.² .............................................. B22D 17/00
[52] U.S. Cl. ............................... 164/108; 29/623.1; 164/303; 164/333; 164/344; 164/404; 164/DIG. 1; 425/123; 425/129 R; 425/DIG. 51
[58] Field of Search ................ H01M/2/24; 164/333, 164/401, 108, 404, DIG.1, 303, 344; 425/441, 443, 444, DIG. 51, 123, 129 R; 429/160; 29/623.1

[56] References Cited

U.S. PATENT DOCUMENTS

| | | | |
|---|---|---|---|
| 1,523,877 | 1/1925 | Keller et al. | 164/108 |
| 2,265,413 | 12/1941 | Young | 164/DIG. 1 |
| 3,444,920 | 5/1969 | McAlpine et al. | 164/108 |
| 3,674,085 | 7/1972 | Clingenpeel et al. | 164/DIG. 1 |
| 3,724,802 | 4/1973 | Veneria | 425/DIG. 51 |
| 3,793,086 | 2/1974 | Badger | 429/160 X |
| 3,874,933 | 4/1975 | Mocas | 164/333 X |
| 3,988,169 | 10/1976 | McLean | 164/DIG. 1 |
| 4,086,695 | 5/1978 | Cornette et al. | 164/DIG. 1 X |

*Primary Examiner*—Roy Lake
*Assistant Examiner*—Mark Rosenbaum
*Attorney, Agent, or Firm*—Watson, Cole, Grindle & Watson

[57] ABSTRACT

A plate strap is die-cast integrally with an upstanding conducting member, which may be either a terminal post or a riser to form part of an intercell connector, by means of a mold having a cavity affording an elongated plate strap position which is closed at the top and has slots in the floor through which the plate lugs project, and a chimney position upstanding from the plate strap position to form the upstanding conducting member. The part of the floor between the plate lugs is formed by cylindrical dowels each having a diameter substantially equal to the spacing between adjacent lugs. The dowels are retracted to permit removal of the mold from the plate strap or straps. A single mold may form a row of plate straps associated with a number of intercell connectors and a pair of terminal posts.

16 Claims, 15 Drawing Figures

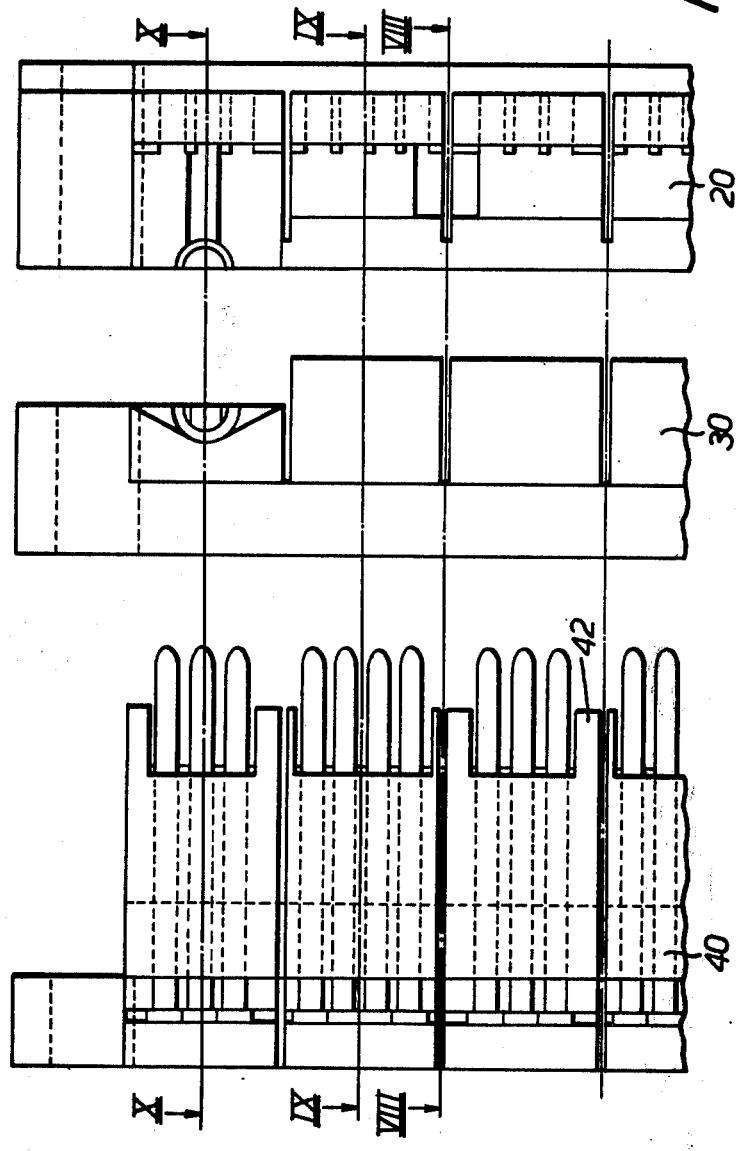

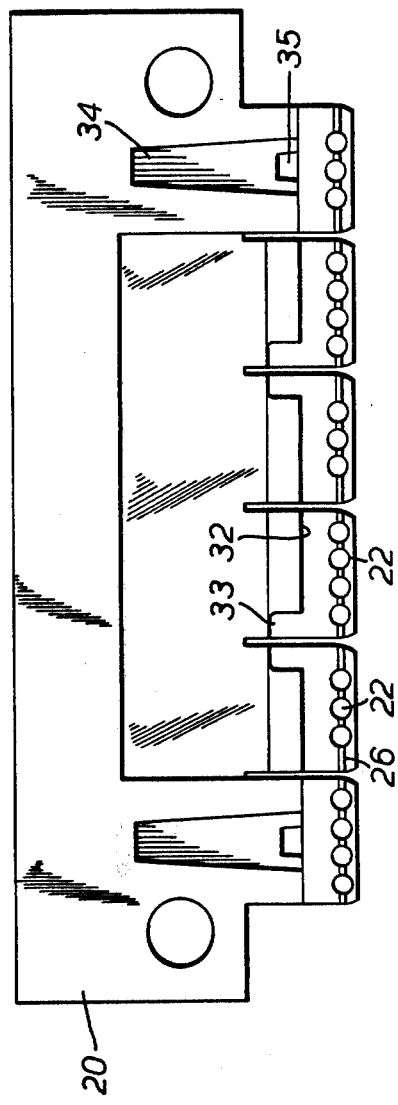
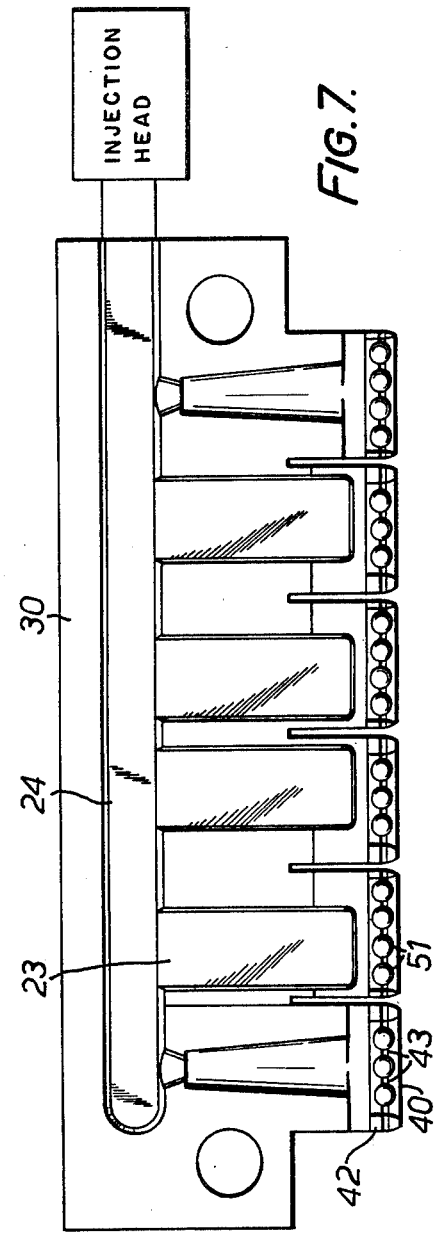

CASTING PLATE STRAPS AND/OR INTERCELL CONNECTORS OF ELECTRIC STORAGE BATTERIES

This invention relates to the casting of plate straps and/or intercell connectors of lead acid electric storage batteries.

According to one aspect of the present invention a method of casting a plate strap includes (a) assembling a group of plates in stacks of alternate polarity with lugs of each polarity in a row, (b) applying to the lugs of each polarity a mold having a cavity affording an elongated plate strap portion which is closed at the top and has slots in the floor through which the plate lugs project, and a chimney portion upstanding from the plate strap portion to form an upstanding conducting member, (c) injecting molten metal into the mold under pressure to pressure die-cast the plate strap and upstanding conducting member, and (d) removing the mold.

The slotted floor of the mold may conveniently be retractable horizontally to allow the mold to be removed vertically relatively to the plate strap. In describing the invention it will be assumed that the plates are in their normal upright orientation and the terms vertical, horizontal, top and bottom will be used on this assumption. An advantage of the invention as compared with certain prior proposals is that it enables the casting to be effected with the plates in their normal upright orientation or slightly inclined thereto.

For forming end terminals the upstanding chimney may be shaped to form a terminal pillar integral with the plate strap. Where an intercell connector is to be formed the upstanding chimney may be shaped to form a riser at one end of the plate strap to serve as part of the intercell connection.

In some cases the plate stacks may be assembled in a jig and transferred to the ultimate battery casing after the plate straps with intercell connectors or terminals, have been formed. In other cases the plate stacks may be assembled in the battery casing. For forming an intercell connector a mold may be applied to lugs of plates of opposite polarity for adjacent cells to cast a combined intercell connector and pair of plate straps.

In one form of the invention each mold cavity is formed with a riser portion upstanding from the end of the plate strap portion adjacent an opening in the partition, the riser portion being exposed to the partition round the opening to form cast risers engaging opposite sides of the partition round the opening integrally with a neck portion passing through the opening.

A preferred feature of the invention, not necessarily confined to die-casting, is that at least the part of the floor of the cavity between the lugs is formed by cylindrical dowels each having a diameter substantially equal to the spacing between adjacent lugs.

Thus according to a further aspect of the invention a method of casting a plate strap to connect plates of a lead acid electric storage battery, includes assembling a group of plates in a stack with lugs in a row, applying to the lugs a mold having a cavity affording at least an elongated portion to form the plate strap which has slots in the floor through which the plate lugs project, introducing molten metal into the mold to form the plate strap uniting the lugs, and removing the mold, characterised in that at least part of the floor of the cavity between the lugs is formed by cylindrical dowels each having a diameter substantially equal to the spacing between adjacent lugs.

A problem that is liable to arise in the casting of plate straps and/or intercell connectors is that of removing the sprue left attached to the casting. If this is forceably pulled off after the mold has been removed it is liable either to disturb or distort the lugs or other portions of plates or to disturb the seal at the point where the intercell connector passes through the partition. Thus in one form of the present invention runners for the injection of metal are formed in a portion of the mold which forms a wall of the cavity which is movable generally in its own plane relatively to an adjacent wall extending in a direction having a component at right angles to that of the previous wall, and the method includes so moving the said portions relatively to one another, after making the casting, as to shear the sprue from the casting. Thus the runner may be formed in a part affording a side wall of the cavity which is movable in a vertical direction relatively to a top wall so that the casting is held firmly by the top wall when the sprue is sheared off. Preferably all the walls of the cavity other than that in which the runner is formed remain in their operative position while the shearing is carried out, so that the casting is confined and gripped and prevented from either moving bodily or tilting.

Thus in one construction the mold comprises a top portion forming the top of the cavity, a dowel guide forming one side of the cavity and providing guides for dowels forming the part of the floor between the plate lugs, and a socket portion forming the side of the cavity opposite the dowel guide and formed with sockets to receive the ends of the dowels, and a groove providing a runner closed by the top portion for supplying metal through a gate to the cavity, the socket portion being movable upwards relatively to the top portion and being so moved after making the casting to shear the sprue from it. The dowels are preferably withdrawn from the socket portion before the latter is moved relatively to the top portion.

It will be appreciated that the slatted floor of the cavity formed by cylindrical dowels produces a cast plate strap in the form of what may be termed an arcade, in which the spaces between adjacent lugs of the plates are roofed over by curved arches. This on the one hand strengthens the mechanical connection between the lugs and the plate strap, and, in addition, by producing progressive cooling of the cast metal as its thickness varies, tends to facilitate the formation of a sounder electrical connection between the plate and plate strap.

The dowels may be retractable independently of the dowel guide and the latter may remain in its casting position while the dowels are retracted and the socket moved up to shear the sprue. Thus the dowel guide may afford end slats forming the bottom of the cavity between the end lugs and the adjacent partition or end wall of the casing, and, after the sprue has been sheared, the dowel guide may be retracted horizontally clear of the casting to permit removal of the mould relatively to the plates and casing.

In an alternative arrangement the runner is formed in a mold portion which affords a side wall and which is movable horizontally in its own plane while an end wall, and preferably the remaining walls of the mold, remain in their operative position.

The methods referred to may provide a reasonable seal against leakage of electrolyte between two cells where there is an intercell connector but such a seal may not always be sufficiently reliable to satisfy commercial requirements. Accordingly in practising the invention in its preferred form the method may also include applying jaws to the risers and squeezing them together to compress the neck and improve the seal of the opening. Preferably each jaw includes a central portion protruding beyond surrounding portions to indent the riser and spread the material of it in a direction having an outward component. The protrusion may be of conical form. Moreover, preferably the jaw comprises an outer portion shaped to confine the riser, and an inner portion affording the protrusion and movable separately from the outer portion to indent the riser while it is confined by the outer portion with a coining action.

Figure 2:
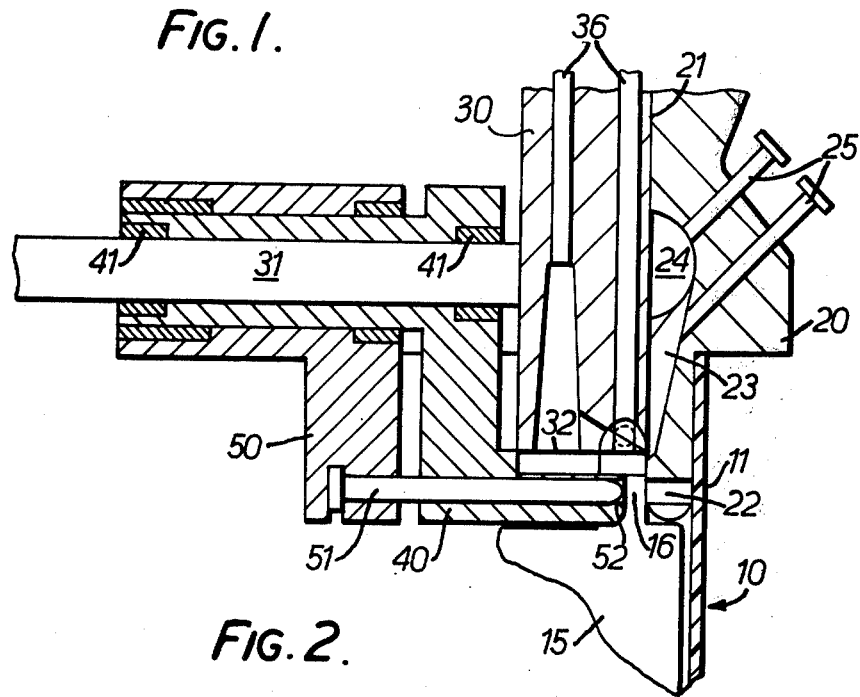
Figure 3:
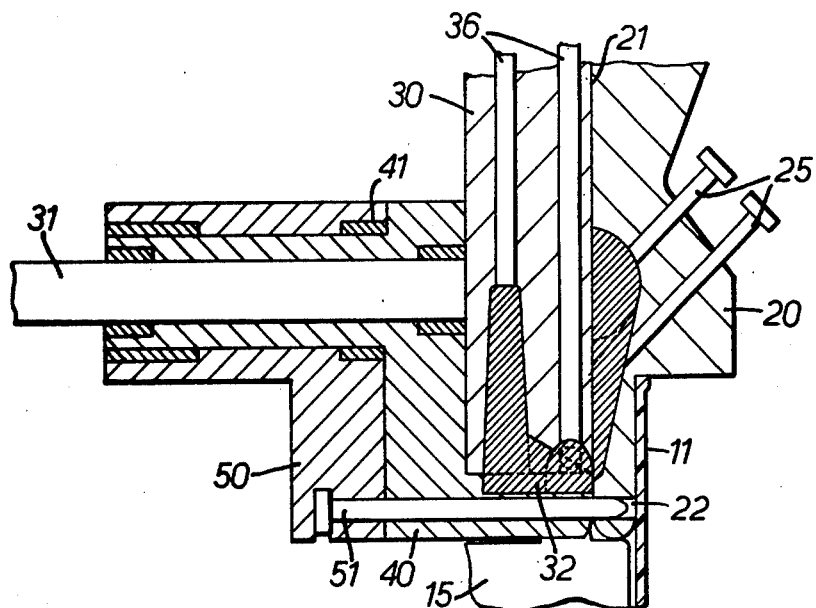
Figure 4:
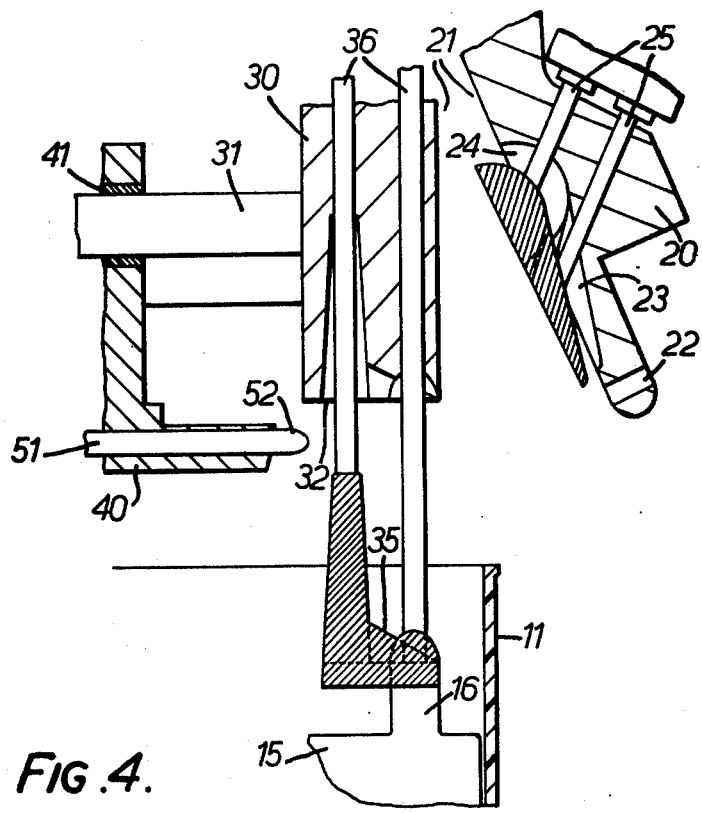
Figure 8:
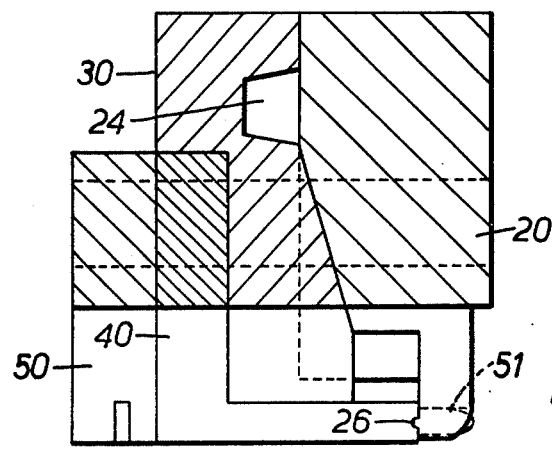
Figure 9:
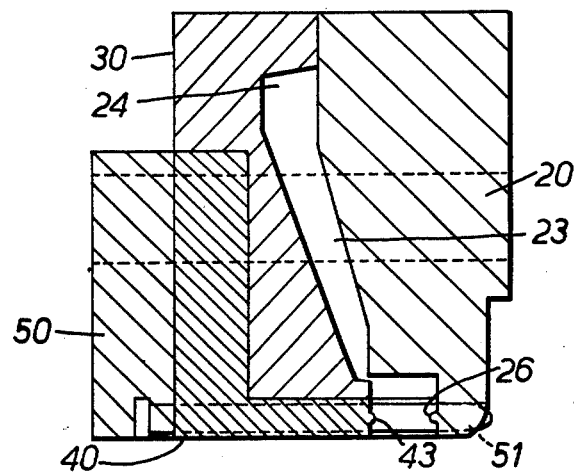
Figure 10:
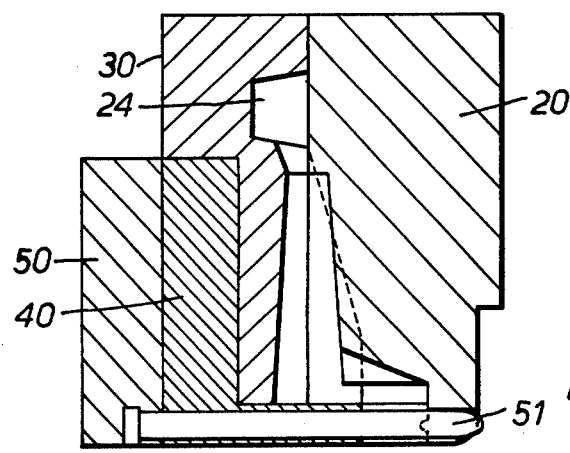
Figure 11:
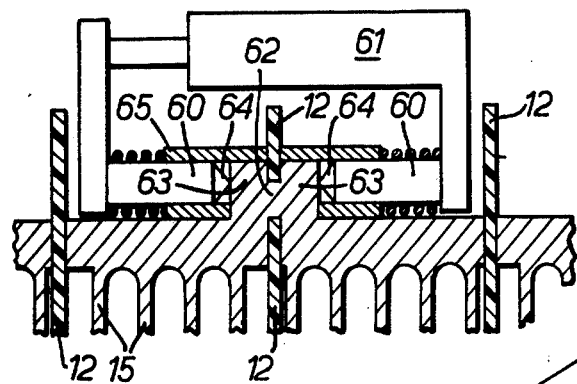
Figure 12:
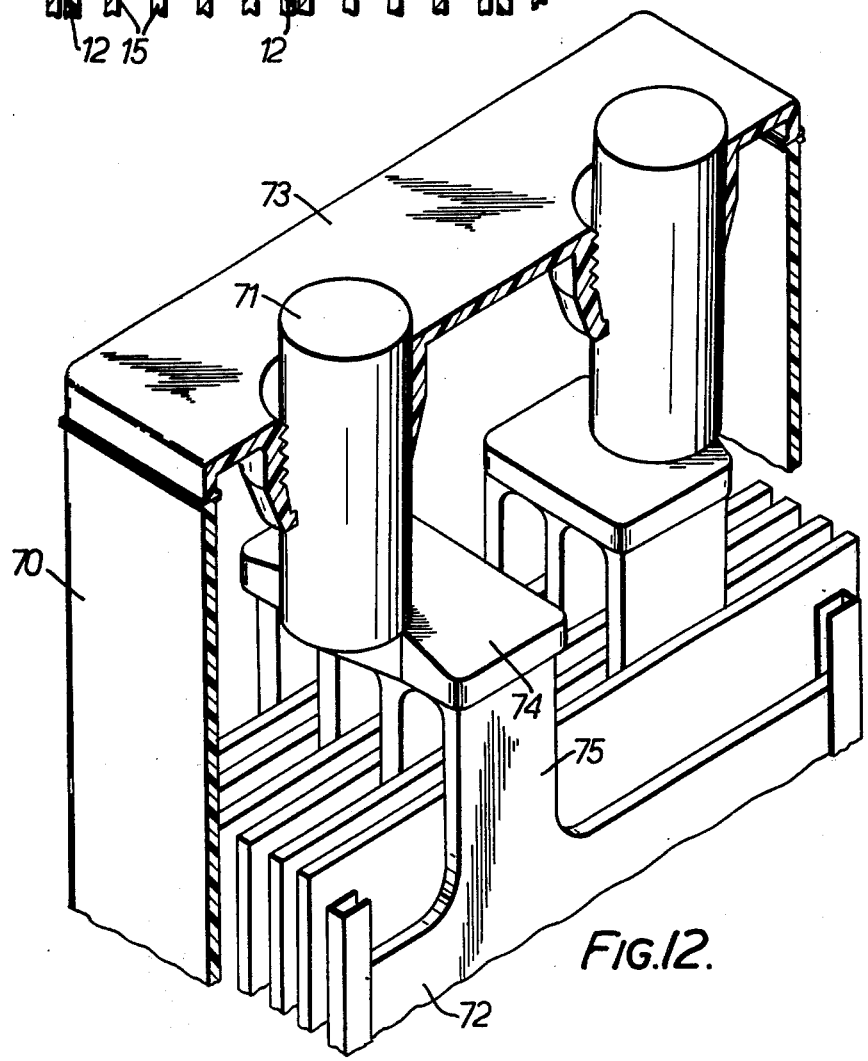

Further features and details of the invention will be apparent from the following description of two specific embodiments, given by way of example, with reference to the accompanying drawings, in which:

FIGS. 1 to 10 relate to one embodiment concerned with a multicell automotive battery and in particular, FIG. 1 is a diagrammatic perspective view of the battery partly broken away, FIGS. 2 to 4 are diagrammatic side elevations of a mold for casting combined plate straps and intercell connectors with the parts shown in three different positions, FIG. 5 is an under plan showing three separated portions of a mold differing in detail from that of FIGS. 2 to 4, FIGS. 6 and 7 are elevations of two of the said portions, respectively showing the rear part viewed from the front and the front part viewed from the rear, FIGS. 8 to 10 are sectional elevations respectively on the lines 8—8, 9—9 and 10—10 of FIG. 5, FIG. 11 is a diagrammatic scrap section showing means for longitudinally compressing an intercell connector, FIGS. 12 to 15 relate to a second embodiment concerned with a single cell of a large traction battery, and in particular, FIG. 12 is a diagrammatic perspective view of the cell partly broken away.

Figure 13:
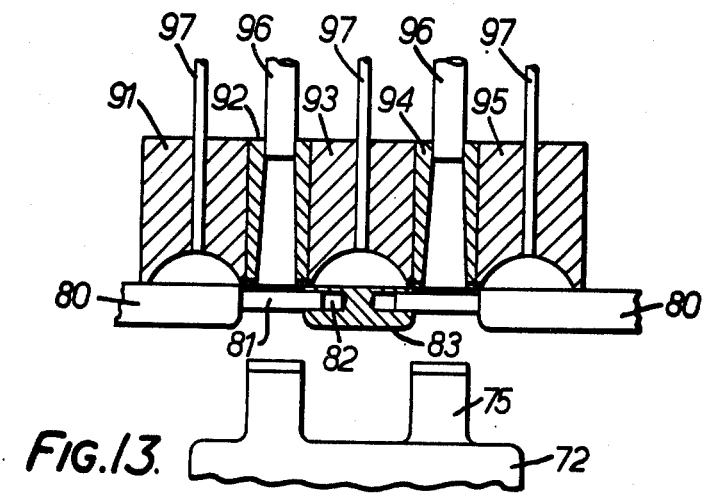
Figure 14:
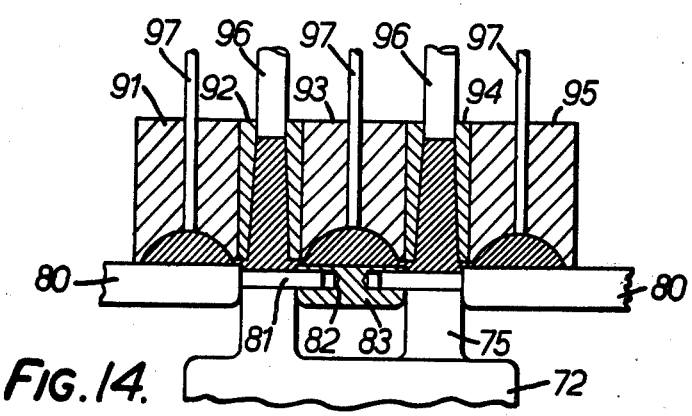
Figure 15:
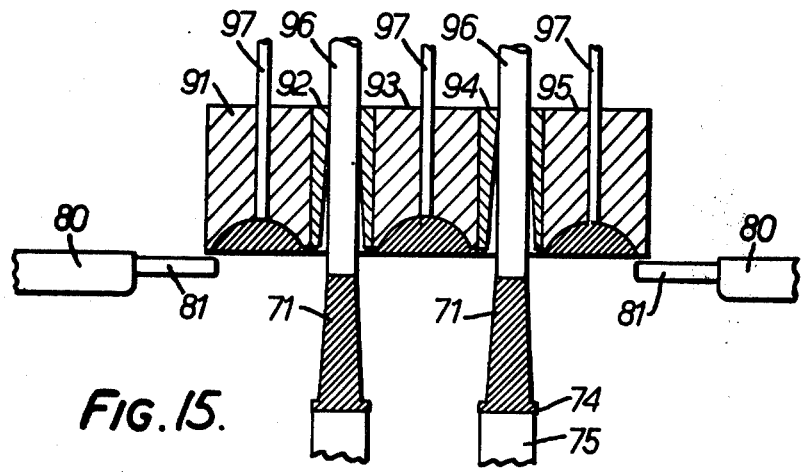

FIGS. 13 to 15 are diagrammatic elevations of a mould with parts shown in different positions for casting combined plate straps and terminal posts.

In the embodiment shown in FIGS. 1 to 10 the invention is applied to the formation of plate straps combined with intercell connectors and terminal pillars in a 12 volt lead-acid motor car starter battery.

In describing the method it will be assumed that the battery casing is in its normal upright orientation and the terms vertical, horizontal, top, and bottom will be used on this assumption. In actual fact the invention may be practised with the container in almost any orientation and the particular orientation may be chosen to ensure the optimum escape of air so as to produce sound castings. For this purpose the container may be inclined to its normal position by about 15° to 25°.

As shown in FIG. 1 the particular battery has a molded casing 10 formed of polypropylene with side walls 11 and integral intercell partitions 12 parallel to the end walls 14 to form 6 cells in a row to contain plates 15 in planes at right angles to the length of the row. The casing has a lid 17.

The plates and separators (not shown) are formed and assembled to form battery elements in any convenient manner, and are inserted into the cells each cell having in it five negative plates and four positive plates with lugs 16 upstanding in two rows. At each point where an intercell connector is to pass through a partition the partition is provided with a hole, for example 8 mm in diameter, with its centre about 19 mm below the upper edge of the partition.

The intercell connector and plate straps are formed integrally by casting. The mold shown in FIGS. 2 to 10 serves to cast the plate straps for a complete row of lugs 16, together with a terminal pillar in each end cell, and two intercell connectors between the intervening cells. The plate straps for the other row of lugs will be formed by a generally similar mold together with three intercell connectors. It is thought unnecessary to describe the latter mold. Each mold extends along the row of lugs and has in its underside slots to receive the upper edges of the intercell partitions.

The mold comprises four parts, an outer block 20, an inner block 30, a dowel guide 40, and a dowel carrier 50. The outer block lies close to the adjacent side wall of the casing and forms the side of the cavity adjacent that wall. The inner block is separated from the outer block by a vertical parting plane 21 lying at right angles to the planes of the plates and containing the outer edges of the lugs. The inner block 30 forms a support for the remaining parts which move relatively to it as described below. The floor of the cavity is slotted to receive the plate lugs and is formed mainly by a number of parallel dowels 51, one fewer than the associated number of plates, having cylindrical surfaces which are a snug fit between the lugs of the plates. The dowels are mounted to slide in parallel bores in the dowel guide which forms the other side of the cavity, namely that remote from the adjacent wall of the container, and is mounted to slide on a pair of horizontal guide rods 31 carried by the inner block and extending in planes parallel to those of the plates. The dowels are secured to the dowel carrier which is mounted to slide on guide sleeves 41 afforded by the dowel guide and surrounding the guide rods 31. The dowel guide and dowel carrier are provided with hydraulic rams (not shown) so that the dowel guide and the dowels can be moved either independently or together.

As indicated above the dowel guide affords the inner side of the cavity, that is to say the side remote from the outer wall of the casing, and in addition it affords fixed slats 42 forming the two end portions of the floor, namely between each of the outermost plate lugs and the partition or end wall of the casing. Thus the floor comprises two fixed slats 42 carried by the dowel guide and each abutting against a partition or end wall of the casing and a number of dowels 51 occupying the spaces between the adjacent lugs. At the end of the plate strap where there is no intercell connection the fixed slat may be deeper, so as to form an end wall to the cavity, if it is not desired that the plate strap should extend right up to the partition.

Each dowel has a bullet-shaped end 52 merging into a cylindrical surface of slightly reduced diameter which fits into a corresponding bore or socket 22 afforded by the outer block 20 in the closed position of the mold. The remainder of the dowel is of uniform diameter which is a sliding fit in the bore of the dowel guide and is an easy fit between the adjacent lugs, to allow air to escape from the cavity.

The roof of the cavity is afforded by the lower face of the inner block 30 of the mold. This is shaped to provide a flat roof 32 of the cavity to form a plate strap of rectangular section, but at one end, where the connection is to pass through the partition, the roof is raised to form what may be termed a chimney 33 in order to produce an upstanding riser. The chimney is open to an area of the intercell partition including and surrounding a hole for the intercell connector. Thus when metal is injected into the cavity it will form a riser upstanding from the strap and the metal will also travel through the hole and join up with that in the cavity of the neighbouring cell so as to form the interconnecting neck through the hole in the partition.

As indicated above the parting surface 21 between the outer and inner blocks is in a vertical plane containing the outer edges of the lugs. A vertical runner is formed in the outer block by a wide groove 23 closed by the vertical face of the inner block and communicates at its lower end with the cavity and at its upper end with a horizontal main runner 24 through which the molten metal is supplied to all the cavities of the mold.

For the negative plates of one end cell and the positive plates of the other end cell the mold has a modified form of cavity which is similar to that described above but instead of forming an intercell connection it forms a terminal pillar. It only differs from the other cavities for making intercell connectors in that the inner block is not formed with a chimney 33 so as to produce a riser but on the contrary is formed with a taller chimney 34 of generally frusto-conical form to provide a terminal pillar. This may be offset inwardly from the plate strap which may be widened so as to extend inwards along a tangent to the pillar, and in addition a wedge shaped rib 35 may be formed on the upper face of the plate strap increasing in depth from the inner edge to the outer edge of the plate strap. This part of the cavity is formed in the inner block in an appropriate manner to produce these shapes.

A number of ejector pins are provided to eject the casting and the sprue from the cavity and runners. Thus a number of vertical pins 36 may extend through vertical bores in the inner member so that their lower ends press on the plate strap and either on the riser in the case of the cavity for intercell connectors or on the terminal pillar in the case of the cavity for the terminal pillar. In addition a number of inclined ejector pins 25 may extend obliquely inwardly and downwardly through bores in the outer block to eject the sprue from the main runner and the gate runners.

The method of casting will now be described.

The complete four-part mold is lowered into a container in which stacks of plates and separators have been assembled. It will be assumed for convenience of discription that the container is held stationary although it will be appreciated that the main inner block of the mould may be held stationary and the container with the plates in it may be brought up into register with it by means of a lift.

At this time as shown in FIG. 2 the outer block is in contact with the main inner block at such a level that the sockets are in line with the dowels, the dowel guide is half retracted so that the end slats extend about half way across the width of the plates lugs and the dowel carrier is further retracted so that the noses of the dowels are level with the ends of the end slats. This enables the end slats to travel down between the end lugs and the partition walls (or a partition wall and an end wall) while the portions of the dowels between the lugs are of reduced diameter so as to allow them to slide down readily between the lugs.

In order to close the mold the dowel guide is advanced to bring the inner side wall of the cavity to its operative position and also to project the end slats to abut against the outer block. This movement of the dowel guide into engagement with the edges of the plate lugs also aligns the latter in their own planes and grips them between the dowel guide and the outer block, to prevent leakage of metal down the edges of the lugs. To assist in this the surfaces of the dowel guide and the outer block may be provided with slight ribs 43 and 26 between the dowels and along a line diametral to the dowels to bite into the edges of the lugs. The movement of the dowel carrier is continued to bring it into contact with the dowel guide and as shown in FIG. 3 to project the reduced end portions of the dowels into the sockets in the outer block and bring portions of the full diameter into the gaps between the lugs, thus completing the slatted floor of the cavity with the lugs projecting up through it.

The injection head of a conventional die casting machine (not shown) is then brought up to an opening in the end of the main runner 24 in the outer mold block and lead is injected under pressure until the mold cavities are full. The pressure is then raised to force lead into the cavities as shrinkage occurs. When the lead has solidified in the mould the pump in the die casting machine is reversed to suck back the molten lead in the head of the machine and the nozzle is immediately withdrawn. Vents are provided in conventional manner for releasing air from the mold cavity. For example, flats may be provided on the vertical ejector pins 36 extending through the inner block, and in addition the fit of the dowels between the lugs may be such as to permit a suitable degree of escape of air, depending upon the precise orientation of the assembly during the die casting operation. Solidification will normally occur within some fifteen to twenty seconds.

The first step in the extraction comprises withdrawing the dowel carrier so as to retract the dowels from their sockets in the outer block. This permits the outer block to be slightly raised in a vertical direction relatively to the remainder of the mold. This operation is of some importance since it shears off the sprue from the casting at the gates while the casting is held firmly in position by the inner block resting on the top of the plate strap and either the riser or the terminal post and gripped between it and the dowel guide, dowels and outer block. Accordingly the sprue can be removed without any fear of distorting the lugs or other parts of the plates, or disturbing the seal of intercell connections.

The dowel guide and dowel carrier are then horizontally retracted fully so as to be clear of the underside of the casting and the mold can be raised out of the battery casing (or the battery casing lowered away from the mold). At this time the vertical ejector pins 36 in the inner mold block remain stationary in relation to the battery so as to eject the casting from the cavity.

Finally the outer block is swung away from the inner block as shown in FIG. 4 and the inclined ejectors in the former are advanced to eject the sprue from the main runner and gate runners for remelting.

The mold is then returned to its initial position for the next casting.

It will be appreciated that each intercell connector formed as described above comprises a pair of plate straps each having an upstanding riser at the intercell partition through which they are to be connected, and a neck of metal extending through a hole in this partition. In fact the lowermost point of the hole in the partition may conveniently be level with the upper surface of the plate straps.

Such an intercell connector may provide a reasonable seal against leakage of electrolyte between the two cells but such a seal may not always be sufficiently reliable to be acceptable.

Accordingly in practising the invention in its preferred form the neck of the intercell connector is squeezed so as to compress it longitudinally, and the formation of the upstanding risers enables this to be conveniently done.

Thus as shown diagrammatically in FIG. 11, after the intercell connectors have been cast, and allowed to cool at least to some extent, but preferably while the plastics material of the partition 12 is still soft, a pair of jaws 60 is applied astride the two risers of each intercell connector and these are pressed together by a hydraulic ram 61. This serves to compress the neck 62 of metal passing through the hole in the partition so as on the one hand to expand it more firmly outwards against the margins of the hole whilst at the same time squeezing the risers 63 towards one another so as to grip the faces of the margins of the hole in the partition 12 more firmly between them. In this way a particularly satisfactory form of seal is obtained in a simple mass-production process.

In order to secure the optimum relationship between swelling of the neck in the hole, and the pressing of the faces of the risers towards one another, without at the same time excessively shifting the plates or distorting their lugs, the jaws between which the risers are gripped may be contoured to provide a protuberance 64, preferably one that is symmetrical about the axis of the neck, for example of wide angled conical form.

Preferably each jaw comprises an outer part 65 which encloses and confines the riser, and an inner part affording the conical protuberance. The outer parts are first closed to confine the material of the risers and restrict it against flowing outwards, whereafter the inner parts are moved towards each other to compress and spread the material of the risers with a coining action.

It will be appreciated that the intercell connectors lie wholly below the upper edges of the intercell partitions so that no problem is presented in securing the lid to the container by heat sealing the lid to the partitions, side walls, and end walls of the casing.

In the embodiment described each end of each plate strap abuts against a partition (or an end wall), as indicated in FIG. 11, whether or not there is an intercell connection passing through it. Thus two lead bars extend substantially continuously from end to end of the battery. These have the advantage of reinforcing the partitions and reducing any tendency they may have to buckling, thus facilitating the fitting and heat sealing of the lid.

In the embodiment described above a single mold is employed for forming each row of plate straps with intercell connectors or intercell connectors and terminals. It will however be appreciated that a mold may be provided to cast each intercell connector separately and another mold to cast a plate strap with a terminal post.

Moreover if the space between the two rows of intercell connectors is sufficient the whole of the plate straps for a battery with intercell connectors or terminals may be cast in a single operation.

In connection with the latter possibility it will be appreciated that there may be difficulty in accommodating the dowel guide and dowel carriers of two molds in the space between the lugs of the positive and negative plates of the same cell so that if the plate straps are to be cast in the ultimate container it may be necessary to cast one row of connections and the other row of connections at different times.

The invention is not however confined to the formation of intercell connectors, and, for the formation of plate straps or combined plate straps and terminal posts, the casting need not be effected in the ultimate container. This also applied to intercell connectors which are lowered into notches in the upper edges of the partitions.

Thus in a further embodiment of the invention illustrated diagrammatically in FIGS. 13 to 15 the invention is applied to the formation of plate straps and terminal posts for large traction batteries in which as shown in FIG. 12, each cell has a separate casing 70 and has terminal posts 71 rising respectively from both sets of plates 72 through the lid 73 and connected externally in series with other cells.

In this case the plate straps 74 and terminal posts are cast, and connected to the lugs 75, with the plates in a jig, and the plates are subsequently transferred to their ultimate container. In these circumstances the side walls of the container do not restrict the space available for the dowels and their guide and carrier and accordingly these are arranged on the outside of the lugs, that is to say the dowel guide and carrier for the lugs of the positive plates are on the side of those lugs remote from the lugs of the negative plates.

Thus as shown diagrammatically in FIGS. 13 to 15 the floors of the two cavities are formed respectively by a pair of dowel carriers 80 mounted to slide horizontally towards one another with both sets of lugs 75 between them. The sockets 82 for the ends of the dowels 81 are afforded by a socket block 83 mounted to slide horizontally in a direction transverse to the direction of movement of the dowels and having sockets 82 for one set of dowels along one side and the other set of dowels along the other side, the width of the socket block being equal to the space between the positive and negative lugs 75 of the cell. In this particular cell the lugs are mounted rather near the middles of the plates so that the space is relatively small.

The dowel guides 80 and socket block 83 are provided with small ribs (not shown) along a line that is diametral to the dowels so as to bite into the edges of the lugs and prevent the escape of metal even if the lugs are of slightly varying width. Thus as the dowel guides are advanced they indent the outer edges of the lugs and as the socket block is advanced its opposite edges also gouge into the inner sides of the lugs to form similar indentations.

Above the dowel guides are five blocks 91 to 95 comprising a middle overflow block 93, between a pair of cavity blocks 92 and 94 lying above the lugs and a pair of sprue blocks 91 and 95 beyond the cavity blocks. The cavity blocks 92 and 94 afford the upper parts of the mold cavities and are movable independently of the other three blocks.

The molten metal is injected through the sprue blocks 91 and 95, whence it passes inwards through gates into the mold cavities to form the plate straps and terminal posts, and thence into an overflow cavity in the overflow block. Five ejectors are provided namely two ejectors 96 in the cavity blocks 92 and 94 and three ejectors 97 in the sprue and overflow blocks 91, 95 and 93.

The operation of the second embodiment is analogous to that of the embodiment first described.

From a position in which they are retracted outwards the dowel carriers are advanced inwards to the position shown in FIG. 13 in which their ends enter the sockets 82 in the socket block 83 but are not fully advanced.

The mold is then lowered towards the plates so that the lugs 75 enter the spaces between the dowels. The dowel carriers are then fully advanced to the position shown in FIG. 14 to close the cavities, and molten lead is injected.

After a suitable cooling time, say 8 to 10 seconds, the sprue and overflow blocks 91, 93, and 95 are moved relatively to the cavity blocks 92 and 94 thereby shearing the runners.

The dowel carriers 80 and the socket block 83 are then fully retracted clear of the cavities and of the sprue runner systems, and the castings are ejected by the ejectors 96 as indicated in FIG. 15. Finally the sprue and overflow cavity sprue is ejected by the ejectors 97 for remelting, and the cycle is repeated.

In other respects the second embodiment is similar to the first and it is thought unnecessary to describe it in further detail.

It will be appreciated that the slatted floor of the cavity formed by cylindrical dowels produces a cast plate strap in the form of what may be termed an arcade, in which the spaces between adjacent lugs of the plates are roofed over by curved arches. This on the one hand strengthens the mechanical connection between the lugs and plate strap, and, in addition, by producing progressive cooling of the cast metal as its thickness varies, tends to facilitate the formation of a sounder electrical connection between the plate and the plate strap.

What we claim is:

1. A method of casting a plate strap to interconnect plates of the same polarity of a lead acid storage battery, comprising the steps of:
    assembling a group of plates in a stack with the plate lugs aligned in a row;
    applying to the lugs a mold having a cavity affording at least an elongated portion to form the plate strap and including slots in the floor through which the plate lugs project, at least that part of the cavity floor between adjacent plate lugs is formed by cylindrical dowels each having a diameter equal to the spacing between adjacent plate lugs;
    introducing molten metal into the mold to form an arcuate-shaped plate strap uniting the lugs;
    allowing progressive cooling of the plate strap due to the arcuate shape thereof; and
    wherein runners for the injection of metal are formed in a portion of the mold which forms a wall of the cavity which is movable generally in its own plane relative to an adjacent wall extending in a direction having a component at right angles to that of the previous wall and further comprising the step of moving said wall and said adjacent wall relative to one another, after making the casting, to shear off the sprue from the casting; and
    removing the mold.

2. A method as claimed in claim 1 in which the runner is formed in a portion affording a side wall of the cavity which is movable in a vertical direction relative to a top wall so that the casting is held firmly by the top wall when the sprue is sheared off.

3. A method as claimed in claim 1 further comprising the step of retaining all the walls of the cavity other than that in which the runner is formed in their operative position while the shearing is carried out during said step of moving, so that the casting is confined and gripped and prevented from either moving bodily or tilting.

4. A method of casting a plate strap to interconnect plates of the same polarity of a lead acid storage battery, comprising the steps of:
    assembling a group of plates in a stack with the plate lugs aligned in a row;
    applying to the lugs a mold having a cavity affording at least an elongated portion to form the plate strap and including slots in the floor through which the plate lugs project, at least that part of the cavity floor between adjacent plate lugs is formed by cylindrical dowels each having a diameter equal to the spacing between adjacent plate lugs;
    introducing molten metal into the mold to form an arcuate-shaped plate strap uniting the lugs;
    allowing progressive cooling of the plate strap due to the arcuate shape thereof; and
    wherein the mold comprises a top portion forming the top of the cavity, a dowel guide forming one side of the cavity and providing guides for the cylindrical dowels, and a socket portion forming the side of the cavity opposite the dowel guide and formed with sockets to receive the ends of the dowels, and a groove providing a runner closed by the top portion for supplying metal through a gate to the cavity, and further comprising the step of moving the socket portion upwards relative to the top portion after making the casting to shear the sprue from it; and
    removing the mold.

5. A method as claimed in claim 4 further comprising the step of retracting the dowels from the socket portion before the latter is moved relative to the top portion.

6. A method as claimed in claim 5 wherein said step of retracting the dowels is independent of the retraction of the dowel guide, and further comprising the step of retaining the dowel guide in its casting position while the dowels are retracted and the socket moved up to shear the sprue.

7. A method as claimed in claim 6 in which the dowel guide affords end slats forming the bottom of the cavity between the end lugs and the adjacent partition or end wall of the casing, and further comprising the step of retracting the dowel guide horizontally clear of the casting to permit removal of the mold relative to the plates and casing after the sprue has been sheared.

8. A method of casting a plate strap to interconnect plates of the same polarity of a lead acid storage battery, comprising the steps of:
    assembling a group of plates in a stack with the plate lugs aligned in a row;
    applying to the lugs a mold having a cavity affording at least an elongated portion to form the plate strap and including slots in the floor through which the plate lugs project, at least that part of the cavity floor between adjacent plate lugs is formed by cylindrical dowels each having a diameter equal to the spacing between adjacent plate lugs;

introducing molten metal into the mold to form an arcuate-shaped plate strap uniting the lugs;

allowing progressive cooling of the plate strap due to the arcuate shape thereof; and further comprising the step of forming a runner in a mold portion which affords a side wall and which is movable horizontally in its own plane while an end wall, and retaining the remaining walls of the mold in their operative position; and removing the mold.

9. A mold for casting a plate strap to interconnect plate lugs of the same polarity of a lead-acid electric storage battery, comprising a top and a floor forming a cavity affording at least an elongated portion to form the plate strap, and including slots in the floor through which the plate lugs project, the improvement comprising that at least the part of the floor of the cavity between the plate lugs is formed by cylindrical dowels each having a diameter substantially equal to the spacing between adjacent plate lugs to enable the formation of arcuate-shaped plate straps and enabling progressive cooling of the plate straps due to their arcuate shape; and runners for the injection of metal formed in a portion of the mold which forms a wall of the cavity which is movable generally in its own plane relative to an adjacent wall extending in a direction having a component at right angles to that of said wall, and said wall and said adjacent wall are movable relative to one another, after making the casting, to shear off the sprue from the casting.

10. A mold as claimed in claim 9 in which the runner is formed in a part affording a side wall of the cavity which is movable in a vertical direction relative to a top wall so that the casting is held firmly by the top wall when the sprue is sheared off.

11. A mold as claimed in claim 9 in which all the walls of the cavity other than that in which the runner is formed remain in their operative position while the shearing is carried out, so that the casting is confined and gripped and prevented from either moving bodily or tilting.

12. A mold for casting a plate strap to interconnect plate lugs of the same polarity of a lead-acid electric storage battery, comprising a top and a floor forming a cavity affording at least an elongated portion to form the plate strap, and including slots in the floor through which the plate lugs project, the improvement comprising that at least the part of the floor of the cavity between the plate lugs is formed by cylindrical dowels each having a diameter substantially equal to the spacing between adjacent plate lugs to enable the formation of arcuate-shaped plate straps and enabling progressive cooling of the plate straps due to their arcuate shape; and a dowel guide forming one side of the cavity and providing guides for dowels forming the part of the floor between the plate lugs, and a socket portion forming the side of the cavity opposite the dowel guide and formed with sockets to receive the ends of the dowels, and a groove providing a runner closed by the top portion for supplying metal through a gate to the cavity, the socket portion being movable upwards relative to the top portion to shear the sprue from it.

13. Molding apparatus for casting a plate strap to interconnect plates of the same polarity of a lead acid electric storage battery, comprising a mold including a cavity including a top and a floor and affording an elongated plate strap portion which is closed at the top and has slots in the floor through which the plate lugs project, and a chimney portion upstanding from the plate strap portion to form an upstanding conducting member, means operatively associated with said mold for injecting molten metal into the mold under pressure to pressure-die-cast the plate strap and upstanding conducting member, said mold further including a dowel guide forming one side of the cavity and providing guides for the cylindrical dowels, and a socket portion forming the side of the cavity opposite the dowel guide and formed with sockets to receive the ends of the dowels, and a groove providing a runner closed by the top portion for supplying metal through a gate to the cavity, said socket portion being movable upwards relative to the top portion after the casting is formed to shear the sprue therefrom.

14. Molding apparatus as claimed in claim 13 in which the slotted floor is retractable horizontally to allow the mold to be removed vertically relative to the plate strap.

15. Molding apparatus as claimed in claim 13 in which the upstanding chimney is shaped to form a terminal pillar integral with the plate strap.

16. Molding apparatus as claimed in claim 13 in which the upstanding chimney portion is shaped to form a riser at one end of the plate strap to serve as part of an intercell connection.

* * * * *